(12) United States Patent
Nakamura et al.

(10) Patent No.: US 11,143,278 B2
(45) Date of Patent: Oct. 12, 2021

(54) ASSISTANCE DEVICE

(71) Applicant: Nabtesco Corporation, Tokyo (JP)

(72) Inventors: Koji Nakamura, Tsu (JP); Masahiro Takahashi, Tsu (JP); Yuto Nakai, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/193,301

(22) Filed: Nov. 16, 2018

(65) Prior Publication Data

US 2019/0162281 A1 May 30, 2019

(30) Foreign Application Priority Data

Nov. 30, 2017 (JP) .............................. JP2017-231040

(51) Int. Cl.
  *F16H 1/32* (2006.01)
  *F16H 37/04* (2006.01)
  *B62D 5/04* (2006.01)
  *B62D 3/02* (2006.01)

(52) U.S. Cl.
  CPC ............. *F16H 37/041* (2013.01); *B62D 3/02* (2013.01); *B62D 5/04* (2013.01); *B62D 5/0421* (2013.01); *F16H 1/32* (2013.01); *F16H 1/321* (2013.01); *F16H 2001/323* (2013.01); *F16H 2001/324* (2013.01); *F16H 2001/327* (2013.01)

(58) Field of Classification Search
  CPC .......... F16H 37/041; F16H 1/321; F16H 1/32; F16H 2001/324; F16H 2001/323; F16H 2001/327; F16H 2001/325; B62D 5/0421; B62D 3/02; B62D 5/04

USPC ....... 475/150, 178, 179, 163; 180/6.38, 6.44
See application file for complete search history.

(56) References Cited

U.S. PATENT DOCUMENTS

| | | | | |
|---|---|---|---|---|
| 10,926,792 B2* | 2/2021 | Rey | ......................... | B62D 5/04 |
| 2006/0240937 A1* | 10/2006 | Shiotsu | .................. | B62D 5/008 475/286 |
| 2010/0179012 A1* | 7/2010 | Kuroumaru | ............. | F16H 1/321 475/164 |
| 2015/0274202 A1* | 10/2015 | Tsunoda | .................. | B62D 5/049 180/446 |

(Continued)

FOREIGN PATENT DOCUMENTS

| DE | 102011003716 A1 * | 8/2012 | ............... B62D 5/04 |
|---|---|---|---|
| DE | 102017200140 A1 | 7/2017 | |

(Continued)

OTHER PUBLICATIONS

English translation of DE102011003716A1; http://translationportal.epo.org; May 14, 2020 (Year: 2020).*

(Continued)

*Primary Examiner* — Roger L Pang
(74) *Attorney, Agent, or Firm* — Pillsbury Winthrop Shaw Pittman, LLP

(57) ABSTRACT

An object of the present invention is to provide a steering assistance device that has a single line of final output, thereby to achieve downsizing. The assistance device of the present application includes a speed reducer configured to decelerate a driving force from a motor and output the decelerated driving force, wherein the speed reducer is configured to receive an operation force produced by an operation of a human.

11 Claims, 6 Drawing Sheets

(56) References Cited

U.S. PATENT DOCUMENTS

2017/0341679 A1* 11/2017 Ikegaya ................. B62D 5/003
2018/0017133 A1* 1/2018 Takahashi ................. F16H 1/32

FOREIGN PATENT DOCUMENTS

| JP | 2010-195184 A | 9/2010 | |
| JP | 2013-035475 A | 2/2013 | |
| JP | 2017-128300 A | 7/2017 | |
| WO | WO-2015030087 A1 * | 3/2015 | ............... B62D 3/02 |

OTHER PUBLICATIONS

English translation of DE102017200140A1; http://translationportal.epo.org; May 14, 2020 (Year: 2020).*
Extended European Search Report dated Apr. 18, 2019 issued in corresponding EP Application No. 18205602.8.
Notice of Reasons for Refusal dated Jun. 22, 2021, issued in corresponding Japanese Patent Application No. 2017-231040 with English translation (9 pgs.).

* cited by examiner

ASSISTANCE DEVICE

CROSS-REFERENCE TO RELATED APPLICATIONS

This application is based on and claims the benefit of priority from Japanese Patent Application Serial No. 2017-231040 (filed on Nov. 30, 2017), the contents of which are hereby incorporated by reference in their entirety.

TECHNICAL FIELD

The present invention relates to assistance devices such as a steering assistance device.

BACKGROUND

Steering assistance devices, an example of assistance devices, are installed on various vehicles to assist steering of drivers. Such steering assistance devices include a torque sensor, a motor, and a speed reducer and transmit a steering assistance force to a steering mechanism.

The torque sensor detects a torque produced in a steering shaft by steering of a driver. The motor produces a driving force corresponding to the detected torque. The driving force is transmitted to the steering mechanism through the speed reducer. Since the speed reducer enlarges the torque transmitted from the motor to the steering mechanism, the driver can steer a vehicle with a light force. In Japanese Patent Application Publication No. 2013-35475 ("the '475 Publication"), the use of a planetary gear device as the speed reducer is proposed The '475 Publication discloses an electric power steering device using an oscillating internal contact-type planetary gear device and requiring a smaller installation space.

In conventional steering assistance devices, a pinion is mounted to the final output shaft of the speed reducer, and the pinion meshes with a rack shaft. On the other hand, a steering force from a driver is also inputted to the rack shaft. Therefore, two lines of large torques are outputted to the rack shaft as final outputs, unfavorably leading to a larger size of the entire device.

SUMMARY

The present invention addresses the above-described circumstances, and an object thereof is to provide a steering assistance device that has a single line of final output, thereby to achieve downsizing.

An assistance device according to one embodiment of the present invention comprises a speed reducer configured to decelerate a driving force from a motor and output the decelerated driving force, wherein the speed reducer is configured to receive an operation force produced by an operation of a human and decelerate the operation force.

In the assistance device according to one embodiment of the present invention, the speed reducer is a two-stage speed reducer, and the operation force produced by the operation of the human is inputted to a second stage of the two-stage speed reducer.

In the assistance device according to one embodiment of the present invention, the speed reducer comprises a crank shaft and an oscillating gear, and the operation force produced by the operation of the human is inputted to the crank shaft.

The assistance device according to one embodiment of the present invention further comprises: a first rotation shaft to be rotated by the operation force produced by the operation of the human; a first gear disposed on the first rotation shaft and a second gear meshing with the first gear and disposed on the crank shaft.

The assistance device according to one embodiment of the present invention further comprises an output shaft for receiving an output of the speed reducer, wherein the motor is fixed to the output shaft.

The assistance device according to one embodiment of the present invention further comprises: a first rotation shaft to be rotated by the operation force produced by the operation of the human; a first bevel gear disposed on the first rotation shaft and a second bevel gear meshing with the first bevel gear, wherein the second bevel gear is connected to the crank shaft, such that the operation force produced by the operation of the human is transmitted to the crank shaft.

In the assistance device according to one embodiment of the present invention, the speed reducer further comprises an idler gear and an input gear, and the second bevel gear is connected to the crank shaft via the idler gear and the input gear.

In the assistance device according to one embodiment of the present invention, the speed reducer is a two-stage speed reducer, and the operation force produced by the operation of the human is inputted to a first stage of the two-stage speed reducer.

In the assistance device according to one embodiment of the present invention, the speed reducer further comprises: a second rotation shaft connected to the motor; an input gear fixed to the second rotation shaft a third gear meshing with the input gear; a crank shaft to which the third gear is fixed; an oscillating gear to be oscillated by the crank shaft and internal teeth meshing with the oscillating gear, and the operation force produced by the operation of the human is inputted to the second rotation shaft.

The assistance device according to one embodiment of the present invention further comprises a first rotation shaft to be rotated by the operation force produced by the operation of the human, wherein the first rotation shaft and the second rotation shaft are connected via a speed-increasing gear.

In the assistance device according to one embodiment of the present invention, an output side of the speed-increasing gear and the second rotation shaft are connected via an orthogonal mechanism.

The assistance device according to one embodiment of the present invention is used for a steering assembly.

Advantages

The assistance device according to one embodiment of the present invention has a single line of final output from the speed reducer, thereby to achieve downsizing.

DESCRIPTION OF THE EMBODIMENTS

Embodiments of the present invention will now be described with reference to the appended drawings.

Figure 1:
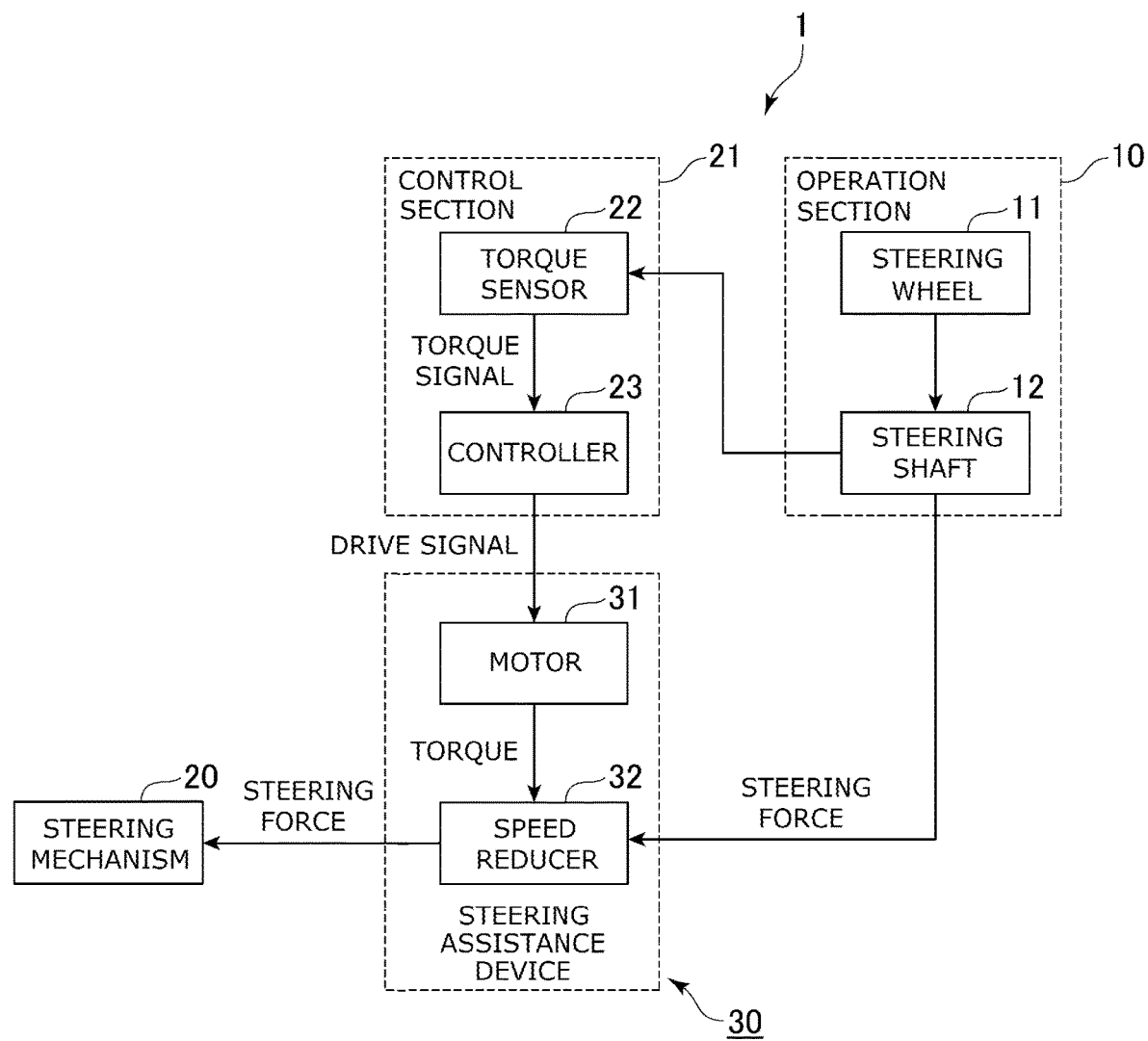
FIG. 1 is a schematic block diagram showing a steering device of one embodiment of the present invention.

FIG. 1 is a schematic block diagram showing a steering device 1 according to one embodiment of the present invention.

The steering device 1 shown is composed of an operation section 10, a steering mechanism 20, a control section 21, and a steering assistance device 30. A steering assembly refers to the operation section 10 alone or the operation section 10 and the steering mechanism 20.

The assistance device can be used for the steering assembly and can also be used for various other apparatuses. This assistance device will be hereinafter referred to as a steering assistance device for convenience of description.

As shown, the operation section 10 is configured to include a steering wheel 11 and a steering shaft 12. A human (hereinafter "the driver") grips the steering wheel 11. To steer a vehicle (not shown), the driver rotates the steering wheel 11. The steering shaft 12 is mechanically connected to the steering wheel 11 and the steering assistance device 30. A steering force applied to the steering wheel 11 by a rotational operation performed by the driver is transmitted to the steering mechanism 20 through the steering shaft 12 and the steering assistance device 30.

The steering mechanism 20 is configured to transmit the steering force applied to the steering wheel 11 to tires (not shown) of the vehicle to steer the tires of the vehicle. A force for steering the tires is adjusted in accordance with the magnitude of the steering force of the driver. Various design forms of mechanical coupling structures are conceivable for the steering wheel 11, the steering shaft 12, the steering assistance device 30, the steering mechanism 20, and the tires, and these design forms can be applied as appropriate.

The control section 21 is configured to include a torque sensor 22 and a controller 23. The torque sensor 22 detects a torque produced in the steering shaft 12. Various forms of the torque sensor 22 are conceivable without any limitation to a particular type thereof.

In order to detect a torque produced in the steering shaft 12, the torque sensor 22 may be directly connected to the steering shaft 12 but need not be directly connected to the steering shaft 12. Various forms of mechanical or electrical connection structures between the torque sensor 22 and the steering shaft 12 are conceivable without any limitation to a particular connection structure.

The steering assistance device 30 includes a motor 31 and a speed reducer 32. The controller 23 controls the motor 31 of the steering assistance device 30 in accordance with a torque signal. In accordance with the magnitude of a torque indicated by the torque signal, the controller 23 causes the motor 31 to output a steering assistance force. The controller 23 processes the torque signal and generates a drive signal for driving the steering assistance device 30. Various forms of operations of the controller 23 are conceivable without any limitation to a particular form.

Meanwhile, the steering force applied to the steering wheel 11 is inputted to the speed reducer 32 through the steering shaft 12. Thus, the steering force applied to the steering wheel 11 is inputted to the speed reducer 32 along with the assistance force from the motor 31, and the output from the speed reducer 32 based on these inputs is finally transmitted to the steering mechanism 20.

The drive signal is outputted from the controller 23 to the motor 31, and the motor 31 rotates in accordance with the drive signal and outputs a torque designated by the drive signal. The torque outputted from the motor 31 varies in accordance with the steering force applied to the steering shaft 12. In the embodiment of the present invention, a driving force is described as referring to the torque outputted from the motor 31.

The torque from the motor 31 is outputted to the speed reducer 32 along with the torque based on the steering force of the steering wheel 11. The speed reducer 32 enlarges the torque based on the steering force and the torque from the motor 31 and outputs a final steering force. The final steering force is outputted to the steering mechanism 20. Thus, the final output is outputted in a single line from the speed reducer 32 of the steering assistance device 30 to the steering mechanism 20, making it possible to downsize the device. Further, the driver is assisted by the assistance force to steer the tires of the vehicle with a small force.

In the steering device 1 shown, various configurations are conceivable for the operation section 10, the steering mechanism 20, the control section 21, and the steering assistance device 30 without any limitation to particular configurations.

Figure 2:
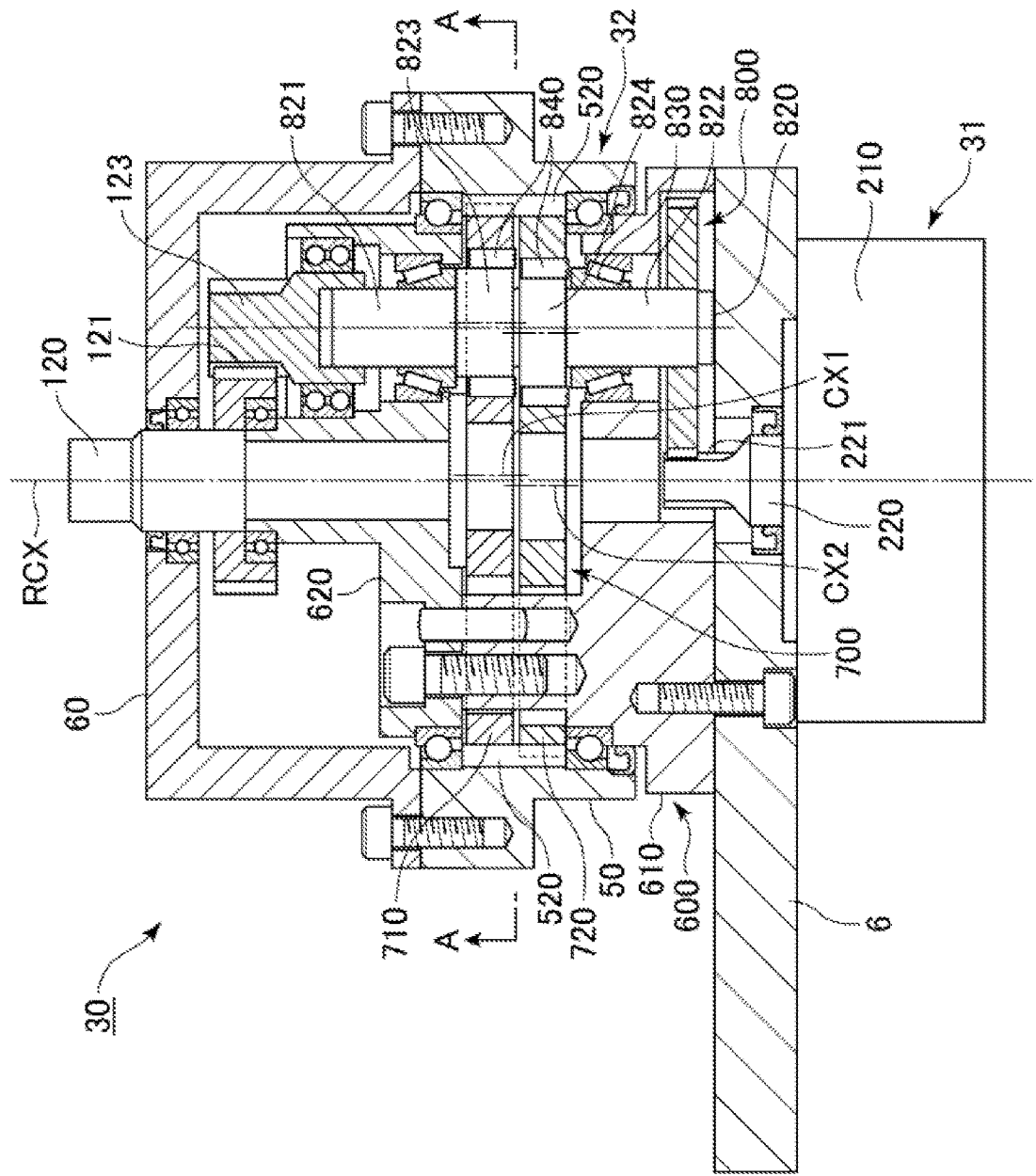
FIG. 2 is a sectional view of the steering assistance device of FIG. 1.
Figure 3:
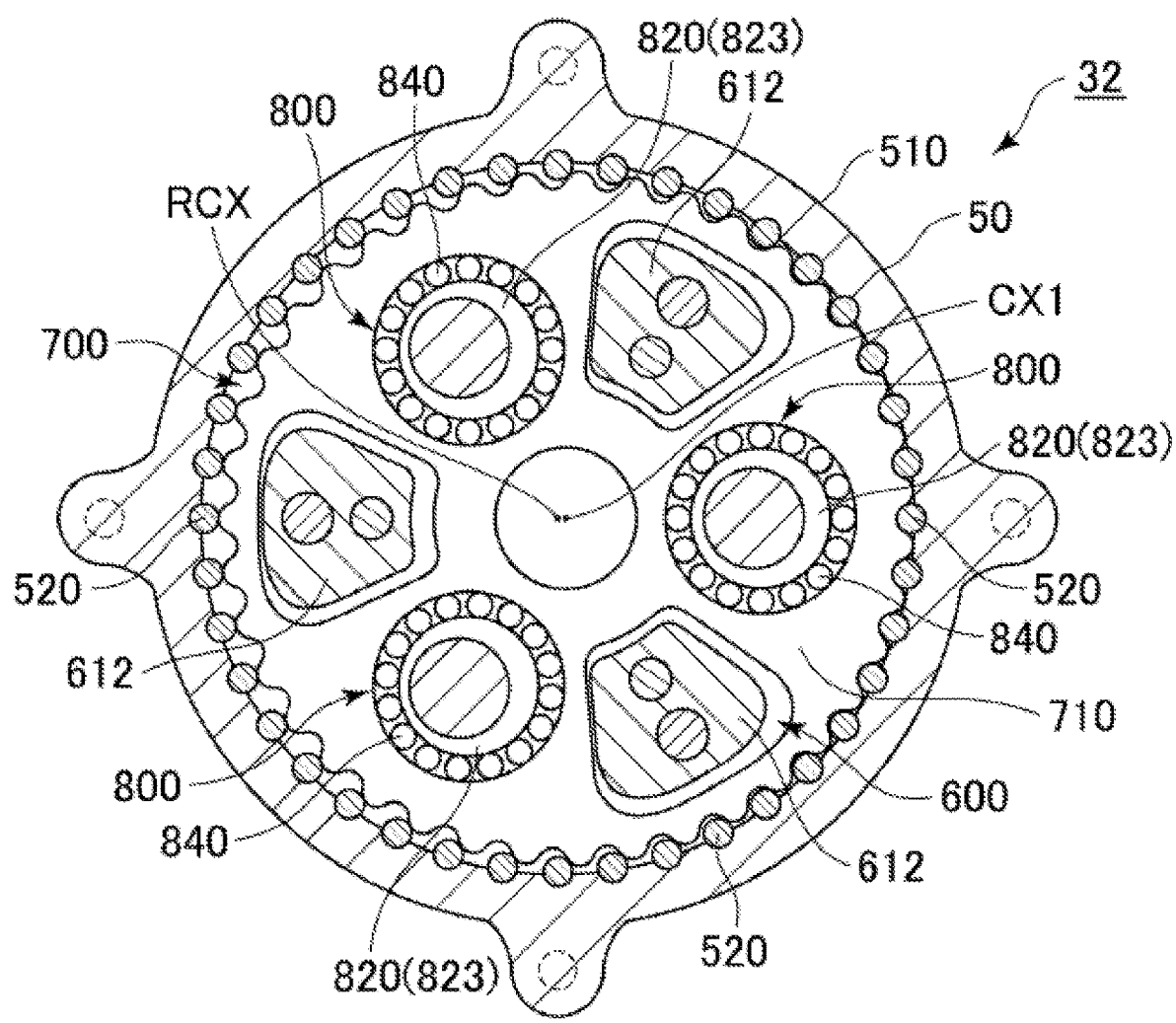
FIG. 3 is a sectional view of the steering assistance device of FIG. 2, the steering assistance device being cut along the line A-A.

Next, FIG. 2 shows a sectional view of the steering assistance device 30 according to one embodiment of the present invention. FIG. 3 is a schematic sectional view of a steering assistance device of FIG. 2 cut along the line A-A.

The steering assistance device 30 shown includes a motor 31, a speed reducer (an eccentric oscillating speed reducer) 32. The motor 31 includes a casing 210 and a motor shaft 220. In the casing 210, there are arranged various components used in conventional motors (for example, a coil and a stator core). The principle of this embodiment is not limited to particular structure in the casing 210.

The motor shaft 220 extends toward the speed reducer 32. A gear section 221 is formed at the end of the motor shaft 220. The gear section 221 meshes with a gear 810 of the speed reducer 32 and receives a torque (a driving force) from the motor 31. As a result, the torque produced by the motor 31 is transmitted to the speed reducer 32.

A steering wheel rotation input section (an input rotation shaft) 120 for receiving rotation from the steering wheel 11 is disposed in a case 60 so as to project toward the speed reducer 32. The steering force of the steering wheel rotation input section 120 is inputted to the speed reducer 32 from the opposite side to the motor 31 via a gear section 121 and a shaft section 123 of the steering wheel rotation input section 120.

Thus, the speed reducer 32 receives the steering force from the steering wheel rotation input section 120, in addition to the driving force from the motor 31. As a result, one output value is outputted from the speed reducer 32 as the final steering force. Thus, the final output from the speed reducer is transmitted in a single line to the steering mechanism, making it possible to downsize the steering assistance device.

As shown in FIG. 2, the speed reducer 32 includes an outer cylinder 50, a gear portion 700, three drive mechanisms 800 (FIG. 2 shows one of the three drive mechanisms 800), and two primary bearings.

As shown in FIG. 3, the outer cylinder 50 includes a case 510 having a substantially cylindrical shape and a plurality of internal tooth pins 520. The case 510 defines a cylindrical internal space in which the carrier 600, the gear portion 700, and the drive mechanisms 800 are arranged. The plurality of internal tooth pins 520 are arranged circularly along an inner peripheral surface of the case 510 to form an internally toothed ring. In the embodiment, the internal tooth pins 520 are examples of internal teeth.

FIG. 3 shows a rotation center axis RCX of the carrier 600 and the motor shaft 220. Each of the internal tooth pins 520 is made of a cylindrical member extending along an extending direction of the rotation center axis RCX. Each of the internal tooth pins 520 is fitted in a groove formed in an inner wall of the case 510. Therefore, each of the internal tooth pins 520 is appropriately retained by the case 510.

The plurality of internal tooth pins 520 are arranged at substantially regular intervals around the rotation center axis RCX. Each of the internal tooth pins 520 has a semicircle surface projecting from the inner wall of the case 510 toward the rotation center axis RCX. Therefore, the plurality of internal tooth pins 520 serve as internal teeth meshing with the gear portion 700.

As shown in FIG. 2, the carrier 600 includes a base portion 610 and an end plate portion 620. The base portion 610 is arranged between the end plate portion 620 and an output shaft 6. The end plate portion 620 is arranged between the base portion 610 and the case 60. The carrier 600 as a whole has a cylindrical shape. The carrier 600 rotates about the rotation center axis RCX within the outer cylinder 50.

The base portion 610 includes three shaft portions 612 (see FIG. 3). Each of the three shaft portions 612 extends from a base plate portion 611 toward the end plate portion 620. The end plate portion 620 is connected to each of end surfaces of the three shaft portions 612. The end plate portion 620 may be connected to each of the end surfaces of the three shaft portions 612 by a reamer bolt, a locating pin, or other techniques.

As shown in FIG. 2, the gear portion 700 is arranged between the base plate portion 611 and the end plate portion 620. The three shaft portions 612 extend through the gear portion 700 and are connected to the end plate portion 620. The gear portion 700 includes a first trochoid gear 710 and a second trochoid gear 720. The first trochoid gear 710 is arranged between the base plate portion 611 and the second trochoid gear 720. The second trochoid gear 720 is arranged between the end plate portion 620 and the first trochoid gear 710. A part of a plurality of external teeth of the first trochoid gear 710 meshes with the internally toothed ring formed of the plurality of internal tooth pins 520.

The rotation of the motor shaft 220 is transmitted to the first trochoid gear 710 and the second trochoid gear 720 by the drive mechanisms 800. As a result, the first trochoid gear 710 and the second trochoid gear 720 rotate so as to oscillate horizontally.

FIG. 2 shows a center axis CX1 of the first trochoid gear 710 and a center axis CX2 of the second trochoid gear 720. The center axes CX1 and CX2 extend substantially in parallel with the rotation center axis RCX of the carrier 600. FIG. 3 shows the center axis CX1 of the first trochoid gear 720. During the above-mentioned oscillating rotation, the center axes CX1 and CX2 revolve around the rotation center axis RCX of the carrier 600. Therefore, the first trochoid gear 710 and the second trochoid gear 720 revolve within the case 510 while meshing with the internal tooth pins 520. Simultaneously, the first trochoid gear 710 and the second trochoid gear 720 contact with the three shaft portions 612 of the carrier 600 and cause the carrier 600 to rotate around the rotation center axis RCX thereof.

The center axis CX2 of the second trochoid gear 720 may revolve around the rotation center axis RCX of the carrier 600 out of phase with the center axis CX1 of the first trochoid gear 710.

The base portion 610 is mounted at its end portion to the output shaft 6. This mounting may be accomplished by fastening a screw as shown in FIG. 2 or by any other method. Thus, the assistance force from the motor 31 and the steering force from the steering wheel 11 are outputted to the output shaft 6 as the final steering force from the speed reducer 32 and transmitted to the steering mechanism 20. FIG. 2 shows that the motor 31 is fixed to the output shaft 6, but other forms of fixation are also applicable.

As shown in FIG. 2, each of the three drive mechanisms 800 includes an input gear 810, a crank shaft 820, two journal bearings 830, and two crank bearings 840. The input gear 810 meshes with the gear section 221 of the motor shaft 220 and receives a torque from the motor 31. Unlike the first trochoid gear 710 and the second trochoid gear 720, the input gear 810 is a spur wheel. Alternatively, the input gear 810 may be other types of gear components. The principle of the embodiment is not limited to a particular type of gear component used as the input gear 810.

As described above, the steering force of the steering wheel rotation input section 120 is inputted to the crank shaft 820 of the speed reducer 32 from the opposite side to the motor 31 via a gear section 121 and a shaft section 123 shown in FIG. 2.

It is also possible that the operation force produced by operation of the driver causes a rotation shaft (a first rotation shaft) in the steering wheel rotation input section 120 to rotate, thereby to cause a first gear disposed on the first rotation shaft to rotate, such that the rotational force is transmitted to the crank shaft 820 having disposed thereon an input gear (a second gear) meshing with the first gear.

A reduction ratio determined by the input gear 810 and the gear section 221 of the motor shaft 220 may be smaller than a reduction ratio determined by the above-mentioned internally toothed ring and the gear portion 700. In one embodiment of the present invention, a first reduction ratio is described as a reduction ratio determined by the input gear 810 and the gear section 221 of the motor shaft 220. Furthermore, a second reduction ratio is described as a reduction ratio determined by the internally toothed ring and the gear portion 700. As described above, the steering force of the steering wheel rotation input section 120 is inputted to the speed reducer 32 from the opposite side to the motor 31 via the gear section 121 and the shaft section 123 of the steering wheel rotation input section 120, but it is also possible that the steering assistance device 30 shown is configured such that the steering force of the steering wheel rotation input section 120 is inputted to the second stage of the speed reducer 32 constituted by a two-stage speed reducer.

When the input gear 810 rotates, the crank shaft 820 rotates. As a result, a first eccentric portion 823 and a second eccentric portion 824 rotate eccentrically. Simultaneously, the first trochoid gear 710 connected to the first eccentric portion 823 via one of the crank bearings 840 can revolve within the outer cylinder 50 while meshing with the plurality of internal tooth pins 520. Likewise, the second trochoid gear 720 connected to the second eccentric portion 824 via the other crank bearing 840 can revolve within the outer cylinder 50 while meshing with the plurality of internal tooth pins 520. As a result, the first trochoid gear 710 and the second trochoid gear 720 can rotate so as to oscillate horizontally within the outer cylinder 50. In the embodiment, a crank mechanism is described as being composed of the crank shaft 820 and the two crank bearings 840.

The crank shaft 820 includes a first journal 821, a second journal 822, a first eccentric portion 823, and a second eccentric portion 824. The first journal 821 is encircled by the base plate portion 611 of the carrier 600. The second journal 822 is encircled by the end plate portion 620 of the carrier 600. One of the two journal bearings 830 is arranged between the first journal 821 and the base plate portion 611. The other of the two journal bearings 830 is arranged between the second journal 822 and the end plate portion 620. In addition, the above-mentioned input gear 810 is mounted on the second journal 822.

Figure 4:
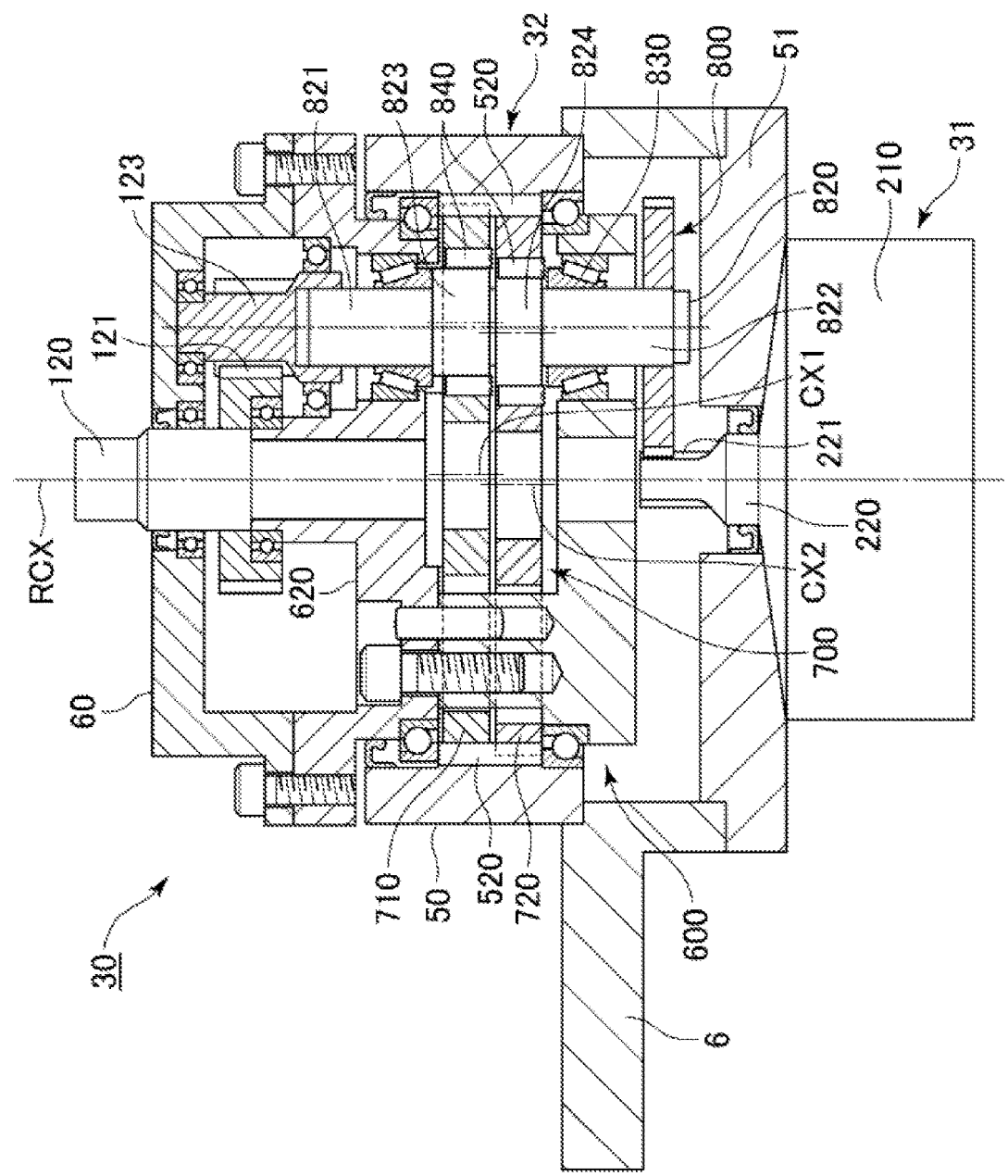
FIG. 4 is a sectional view of a steering assistance device according to another embodiment of the present invention.

Next, FIG. 4 shows a sectional view of another steering assistance device 30 according to one embodiment of the present invention. The steering assistance device 30 according to one embodiment of the present invention will now be described with reference to FIG. 4. Description of the same elements as in the steering assistance device 30 of FIG. 2 will be omitted.

The steering assistance device 30 shown includes a motor 31, a speed reducer (an eccentric oscillating speed reducer) 32. The motor 31 includes a casing 210 and a motor shaft 220. In the casing 210, there are arranged various components used in conventional motors (for example, a coil and a stator core). The principle of this embodiment is not limited to particular structure in the casing 210.

The steering assistance device 30 shown includes a case 51 arranged so as to cover the motor 31 side of the speed reducer 32. In the example shown, the motor 31 is mounted to the case 51.

The motor shaft 220 extends toward the speed reducer 32. A gear section 221 is formed at the end of the motor shaft 220. The gear section 221 meshes with a gear 810 of the speed reducer 32 and receives a torque (a driving force) from the motor 31. As a result, the torque produced by the motor 31 is transmitted to the speed reducer 32.

In the steering assistance device 30 shown, a steering wheel rotation input section (an input rotation shaft) 120 for receiving rotation from the steering wheel 11 is disposed in a case 60 so as to project toward the speed reducer 32. The steering force of the steering wheel rotation input section 120 is inputted to the speed reducer 32 from the opposite side to the motor 31 via a gear section 121 and a shaft section 123 of the steering wheel rotation input section 120.

In the example shown, an output shaft 6 is mounted to the case 51 of the steering assistance device 30, unlike the example shown in FIG. 2. This mounting may be accomplished by fastening a screw as shown in FIG. 2 or by any other method Thus, the assistance force from the motor 31 and the steering force from the steering wheel 11 are outputted to the output shaft 6 as the final steering force from the speed reducer 32 and transmitted to the steering mechanism 20.

As in FIG. 2, each of the three drive mechanisms 800 includes an input gear 810, a crank shaft 820, two journal bearings 830, and two crank bearings 840. The input gear 810 meshes with the gear section 221 of the motor shaft 220 and receives a torque from the motor 31. Unlike the first trochoid gear 710 and the second trochoid gear 720, the input gear 810 is a spur wheel. Alternatively, the input gear 810 may be other types of gear components. The principle of the embodiment is not limited to a particular type of gear component used as the input gear 810.

As in FIG. 2, the steering force of the steering wheel rotation input section 120 is inputted to the crank shaft 820 of the speed reducer 32 from the opposite side to the motor 31 via a gear section 121 and a shaft section 123 shown in FIG. 2.

Thus, the speed reducer 32 receives the steering force from the steering wheel rotation input section 120, in addition to the driving force from the motor 31. As a result, one output value is outputted from the speed reducer 32 as the final steering force. Thus, the final output from the speed reducer is transmitted in a single line to the steering mechanism, making it possible to downsize the steering assistance device.

Figure 5:
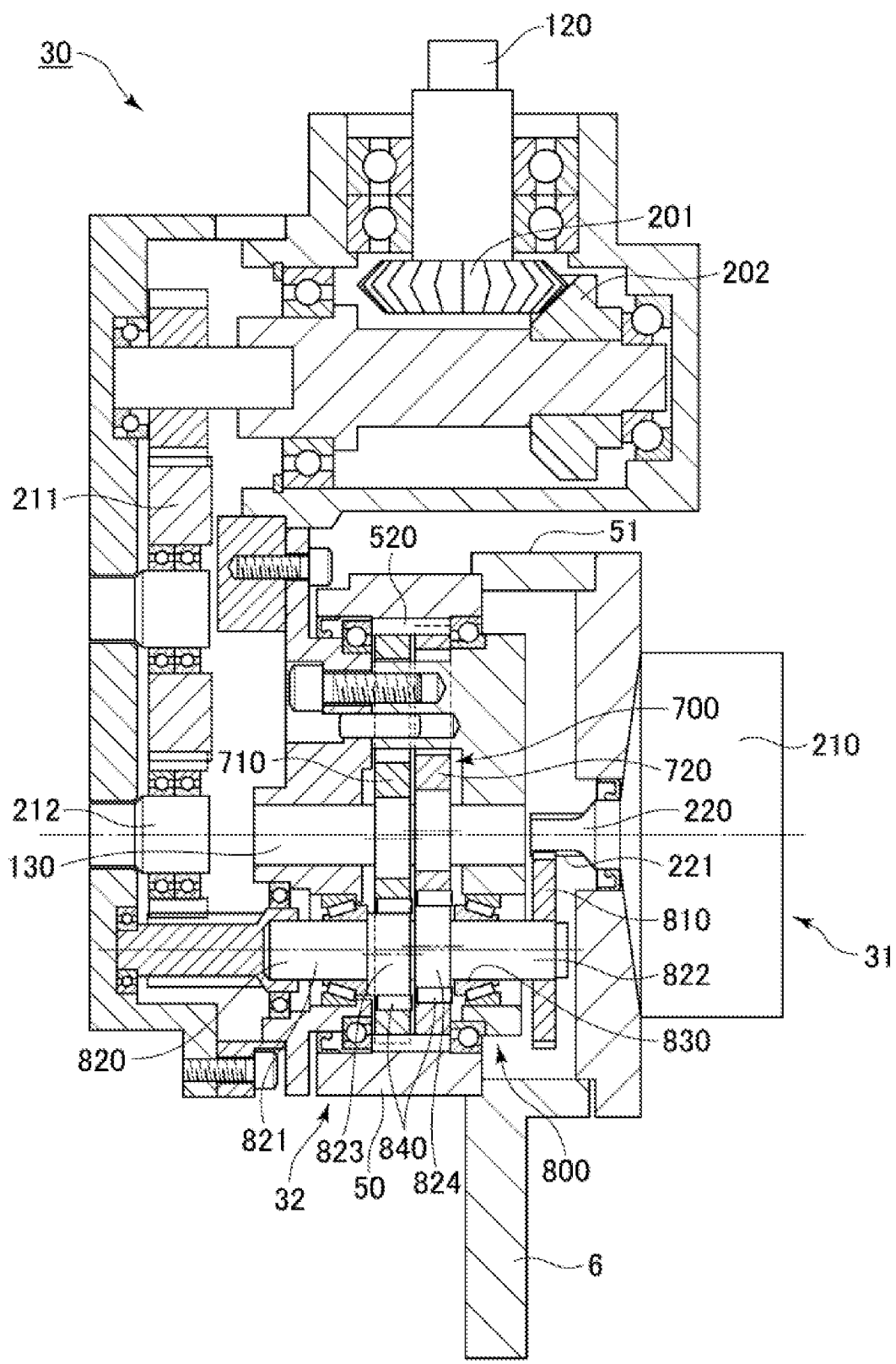
FIG. 5 is a sectional view of a steering assistance device according to another embodiment of the present invention.

Next, FIG. 5 shows a sectional view of still another steering assistance device 30 according to one embodiment of the present invention. The steering assistance device 30 according to one embodiment of the present invention will now be described with reference to FIG. 5.

The steering assistance device 30 shown includes a motor 31 and a speed reducer (an eccentric oscillating speed reducer) 32. The motor 31 includes a casing 210 and a motor shaft 220. In the casing 210, there are arranged various components used in conventional motors (for example, a coil and a stator core). The principle of this embodiment is not limited to particular structure in the casing 210.

The steering assistance device 30 shown includes a case 51 arranged so as to cover the motor 31 side of the speed reducer 32. In the example shown, the motor 31 is mounted to the case 51.

The motor shaft 220 extends toward the speed reducer 32. A gear section 221 is formed at the end of the motor shaft 220. The gear section 221 meshes with a gear 810 of the speed reducer 32 and receives a torque (a driving force) from the motor 31. As a result, the torque produced by the motor 31 is transmitted to the speed reducer 32.

In the steering assistance device 30 shown, a steering wheel rotation input section (an input rotation shaft) 120 for receiving rotation from the steering wheel 11 is disposed in a case 60 so as to project toward a side of the speed reducer 32. The steering force of the steering wheel rotation input section 120 is inputted to a crank shaft 820 of the speed reducer 32 via a first bevel gear 201 disposed on the input rotation shaft (a first rotation shaft) 120, a second bevel gear 202 meshing with the first bevel gear 201, an idler gear 211, an input gear 212, and an input shaft 130.

It is also possible that the steering assistance device 30 according to one embodiment of the present invention is configured such that the steering force of the steering wheel rotation input section 120 is inputted to the crank shaft 820 of the speed reducer 32 via the first bevel gear 201 disposed on the input rotation shaft (a first rotation shaft) 120 and the second bevel gear 202 meshing with the first bevel gear 201. As described above, the operation force produced by operation of the driver is transmitted to the crank shaft 820 of the speed reducer 32 from the steering wheel rotation input section (the input rotation shaft) 120.

Thus, in the example shown in FIG. 5, the steering force of the steering wheel rotation input section 120 is inputted from a side of the speed reducer 32, and inputted to the crank shaft 820 of the speed reducer 32 from the opposite side to the motor 31. The speed reducer 32 receives the steering force from the steering wheel rotation input section 120, in addition to the driving force from the motor 31. As a result, one output value is outputted from the speed reducer 32 as the final steering force. Thus, the final output from the speed reducer is transmitted in a single line to the steering mechanism, making it possible to downsize the steering assistance device.

In the example shown, an output shaft 6 is mounted to the case 51 of the steering assistance device 30, unlike the example shown in FIG. 2. This mounting may be accomplished by fastening a screw as shown in FIG. 2 or by any other method Thus, the assistance force from the motor 31 and the steering force from the steering wheel 11 are outputted to the output shaft 6 as the final steering force from the speed reducer 32 and transmitted to the steering mechanism 20.

As in FIGS. 2 and 4, each of the three drive mechanisms 800 includes an input gear 810, a crank shaft 820, two journal bearings 830, and two crank bearings 840. The input gear 810 meshes with the gear section 221 of the motor shaft 220 and receives a torque from the motor 31. Unlike the first trochoid gear 710 and the second trochoid gear 720, the input gear 810 is a spur wheel. Alternatively, the input gear 810 may be other types of gear components. The principle of the embodiment is not limited to a particular type of gear component used as the input gear 810. Since the constituents and the operations of the speed reducer 32 have been described in detail for FIGS. 2 and 3, further description thereof is omitted now.

As described above, the steering force of the steering wheel rotation input section 120 is inputted to the crank shaft 820 of the speed reducer 32 from a side of the speed reducer via the first bevel gear 201 disposed on the input rotation shaft (a first rotation shaft) 120 and the second bevel gear 202 meshing with the first bevel gear 201.

Thus, the speed reducer 32 receives the steering force from the steering wheel rotation input section 120, in addition to the driving force from the motor 31. As a result, one output value is outputted from the speed reducer 32 as the final steering force. Thus, the final output from the speed reducer is transmitted in a single line to the steering mechanism, making it possible to downsize the steering assistance device.

Figure 6:
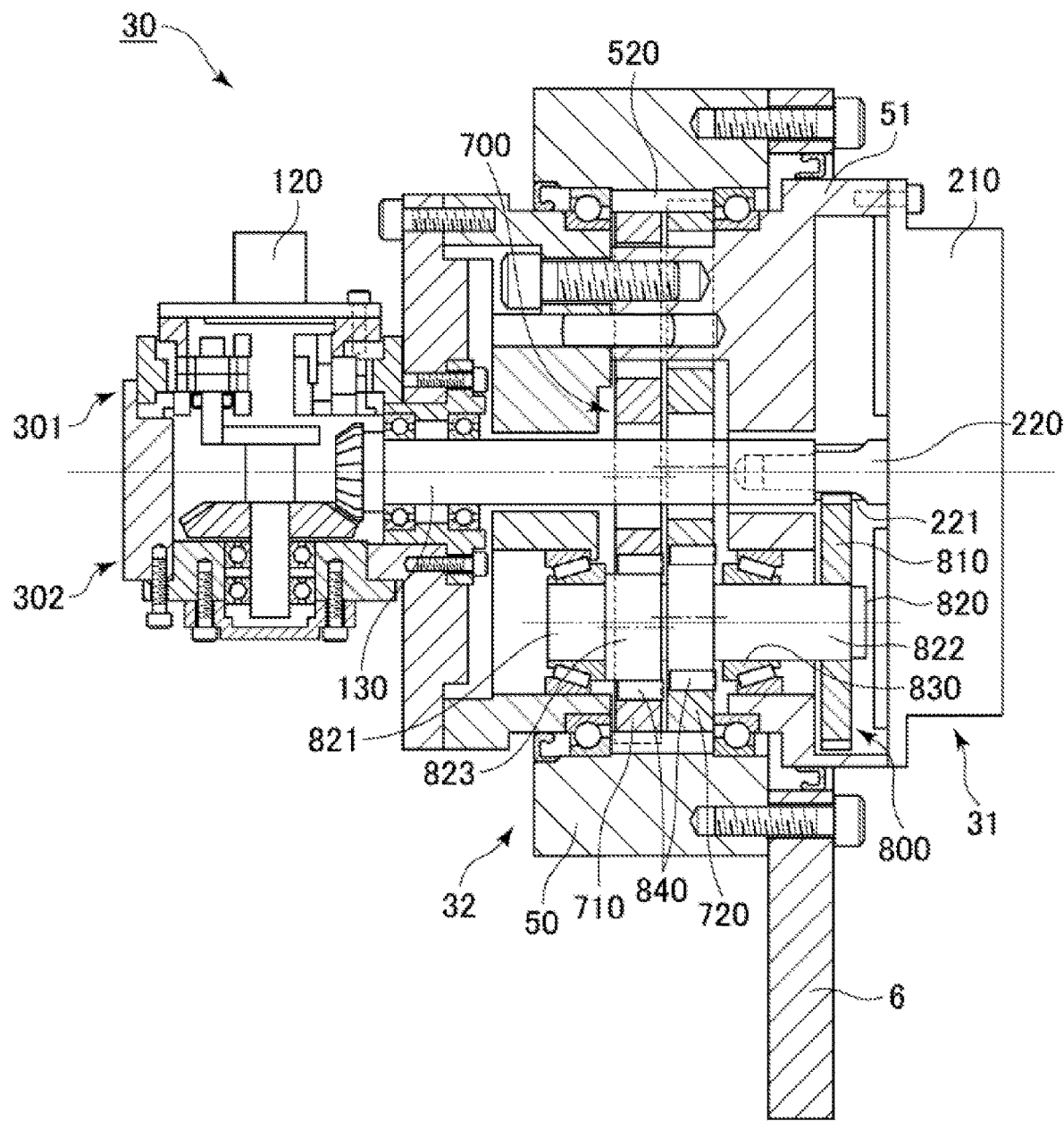
FIG. 6 is a sectional view of a steering assistance device according to another embodiment of the present invention.

Next, FIG. 6 shows a sectional view of yet another steering assistance device 30 according to one embodiment of the present invention. The steering assistance device 30 according to one embodiment of the present invention will now be described with reference to FIG. 6.

The steering assistance device 30 shown includes a motor 31, a speed reducer (an eccentric oscillating speed reducer) 32. The motor 31 includes a casing 210 and a motor shaft 220. In the casing 210, there are arranged various components used in conventional motors (for example, a coil and a stator core). The principle of this embodiment is not limited to particular structure in the casing 210.

The steering assistance device 30 shown includes a case 51 that is open toward the motor 31 side of the speed reducer 32. In the example shown, the motor 31 is mounted to the case 51.

The motor shaft 220 extends toward the speed reducer 32. A gear section 221 is formed at the end of the motor shaft 220. The gear section 221 meshes with a gear 810 of the speed reducer 32 and receives a torque (a driving force) from the motor 31. As a result, the torque produced by the motor 31 is transmitted to the speed reducer 32.

In the steering assistance device 30 shown, a steering wheel rotation input section (an input rotation shaft) 120 for receiving rotation from the steering wheel 11 is disposed so as to project laterally from a side of the speed reducer 32 opposite to the motor. The steering force of the steering wheel rotation input section 120 is inputted from the input rotation shaft (a first rotation shaft) 120 to a crank shaft 820 of the speed reducer 32 via a gear mechanism 301 configured as a speed-increasing gear, an orthogonal mechanism (a bevel gear) 302, an input shaft 130 connected with the motor, and a spur wheel 221.

It is also possible that the steering force of the steering wheel rotation input section 120 is inputted from the input rotation shaft (a first rotation shaft) 120 to a crank shaft 820 of the speed reducer 32 via a gear mechanism 301 configured as a speed-increasing gear, an input shaft 130 connected with the motor, and a spur wheel 221. Alternatively, it is also possible that the steering force of the steering wheel rotation input section 120 is inputted from the input rotation shaft (a first rotation shaft) 120 to a crank shaft 820 of the speed reducer 32 via a gear mechanism 301 configured as a speed-increasing gear, an input shaft 130 connected with the motor, and a spur wheel 221.

In the example shown in FIG. 6, the steering force of the steering wheel rotation input section 120 is inputted laterally from a side of the speed reducer 32 opposite to the motor 31, converted orthogonally by an orthogonal mechanism (a bevel gear) 302, and inputted to the crank shaft 820 of the speed reducer 32. The speed reducer 32 receives the steering force from the steering wheel rotation input section 120, in addition to the driving force from the motor 31. As a result, one output value is outputted from the speed reducer 32 as the final steering force.

Thus, the final output from the speed reducer is transmitted in a single line to the steering mechanism, making it possible to downsize the steering assistance device. In addition, the rotation input from the steering wheel 11 is accelerated and transmitted to the speed reducer 32, and therefore, the rotation input can be transmitted to the output shaft while keeping the speed ratio unchanged, thereby to secure the safety without degradation of operability.

In the example shown, an output shaft 6 is mounted to the case 50 of the steering assistance device 30. This mounting may be accomplished by fastening a screw as shown in FIG. 2 or by any other method. Thus, the assistance force from the motor 31 and the steering force from the steering wheel 11 are outputted to the output shaft 6 as the final steering force from the speed reducer 32 and transmitted to the steering mechanism 20.

In the example shown in FIG. 6, each of the three drive mechanisms 800 includes an input gear 810, a crank shaft 820, two journal bearings 830, and two crank bearings 840. The input gear 810 meshes with the gear section 221 of the motor shaft 220 and receives a torque from the motor 31. Unlike the first trochoid gear 710 and the second trochoid gear 720, the input gear 810 is a spur wheel. Alternatively, the input gear 810 may be other types of gear components. The principle of the embodiment is not limited to a particular type of gear component used as the input gear 810. Since the constituents and the operations of the speed reducer 32 have been described in detail for FIGS. 2 and 3, further description thereof is omitted now.

As described above, the steering force of the steering wheel rotation input section 120 is inputted from the input rotation shaft (a first rotation shaft) 120 to the crank shaft 820 of the speed reducer 32 via the gear mechanism 301 configured as a speed-increasing gear, the orthogonal mechanism (a bevel gear) 302, the input shaft 130, and the spur wheel 221.

The speed reducer 32 receives the steering force from the steering wheel rotation input section 120, in addition to the driving force from the motor 31. As a result, one output value is outputted from the speed reducer 32 as the final steering force. Thus, the final output from the speed reducer is transmitted in a single line to the steering mechanism, making it possible to downsize the steering assistance device. In addition, the rotation input from the steering wheel 11 is accelerated and transmitted to the speed reducer 32, and therefore, the rotation input can be transmitted to the output shaft while keeping the speed ratio unchanged, thereby to secure the safety without degradation of operability.

The examples of the embodiments of the present invention have been described above. The above various embodiments are not limited to the configurations described above and can be applied to various types of steering devices. Some of the various features described for any one of the above various embodiments may be applied to the steering device described for another of the embodiments.

What is claimed is:

1. An assistance device comprising:
a speed reducer configured to:
    receive an operation force produced by a manual input along with a driving force from a motor, and output a steering force based on the received operation force from the manual input and based on the received driving force from the motor; and
an output shaft configured to:
    receive the steering force, based on the operation force from the manual input and based on the driving force from the motor, from the speed reducer, and
    transmit the steering force to a steering mechanism,
wherein the speed reducer comprises a crank shaft and an oscillating gear, and
wherein the operation force produced by the manual input is inputted to the crank shaft.

2. The assistance device of claim 1, wherein the speed reducer is a two-stage speed reducer, and
wherein the operation force produced by the manual input is inputted to a second stage of the two-stage speed reducer.

3. The assistance device of claim 1, further comprising:
a first rotation shaft configured to be rotated by the operation force produced by the manual input;
a first gear configured to be disposed on the first rotation shaft; and
a second gear configured to mesh with the first gear and configured to be disposed on the crank shaft.

4. The assistance device of claim 3, wherein the motor is configured to be fixed to the output shaft.

5. The assistance device of claim 1, further comprising:
a first rotation shaft configured to be rotated by the operation force produced by the manual input;
a first bevel gear configured to be disposed on the first rotation shaft; and
a second bevel gear configured to mesh with the first bevel gear,
wherein the second bevel gear is configured to be connected to the crank shaft, such that the operation force produced by the manual input is transmitted to the crank shaft.

6. The assistance device of claim 5, wherein the speed reducer further comprises an idler gear and an input gear, and
wherein the second bevel gear is connected to the crank shaft via the idler gear and the input gear.

7. The assistance device of claim 1, wherein the speed reducer is a two-stage speed reducer, and
wherein the operation force produced by the manual input is inputted to a first stage of the two-stage speed reducer.

8. The assistance device of claim 1, wherein the speed reducer comprises:
a second rotation shaft configured to be connected to the motor;
an input gear configured to be fixed to the second rotation shaft;
a third gear configured to mesh with the input gear;
a crank shaft to which the third gear is fixed;
an oscillating gear configured to be oscillated by the crank shaft; and
internal teeth configured to mesh with the oscillating gear, and
wherein the operation force produced by the manual input is inputted to a first rotation shaft.

9. The assistance device of claim 8, further comprising a first rotation shaft to be rotated by the operation force produced by the manual input,
wherein the first rotation shaft and the second rotation shaft are connected via a speed-increasing gear.

10. The assistance device of claim 9, wherein an output side of the speed-increasing gear and the second rotation shaft are connected via an orthogonal mechanism.

11. The assistance device of claim 1, wherein the assistance device is used for a steering assembly.

* * * * *